United States Patent [19]

Diaz et al.

[11] 4,134,873

[45] Jan. 16, 1979

[54] POLYURETHANE TOPCOAT COMPOSITION

[75] Inventors: Francis A. Diaz, Chicago; Angelo F. Leo, Palatine, both of Ill.

[73] Assignee: DeSoto, Inc., Des Plaines, Ill.

[21] Appl. No.: 790,419

[22] Filed: Apr. 25, 1977

[51] Int. Cl.$^2$ ............... C08G 18/42; C08L 75/06; C08K 3/22
[52] U.S. Cl. ............... 260/37 N; 260/DIG. 34; 528/73
[58] Field of Search ....... 260/75 NQ, 37 N, DIG. 34, 260/75 NM

[56] References Cited

U.S. PATENT DOCUMENTS 3,889,036  6/1975  Preston .................. 260/DIG. 34

*Primary Examiner*—H.S. Cockeram

*Attorney, Agent, or Firm*—Dressler, Goldsmith, Clement, Gordon & Shore, Ltd.

[57] ABSTRACT

A polyurethane topcoat composition is provided comprising a water-free organic solvent solution containing from 0.5–2.6 isocyanate equivalents of the biuret of 1,6-hexamethylene diisocyanate per hydroxy equivalent of the polyesterification reaction product of the components set forth below having an acid number of less than 7:

| Component | Parts by Weight | Permitted Variation |
|---|---|---|
| 1,6-hexanediol | 11.63 | ± 1.0 |
| di-(2-hydroxyethyl) dimethylhydantoin | 20.92 | ± 1.0 |
| trimethylol propane | 17.75 | ± 1.0 |
| dimethyl terephthalate | 28.10 | ± 1.0 |
| adipic acid | 21.15 | ± 1.0 |

6 Claims, No Drawings

POLYURETHANE TOPCOAT COMPOSITION

The present invention relates to flexible fluid resistant polyurethane topcoats which provide a broad spectrum of superior properties.

Polyurethane topcoats based on a combination of hydroxylfunctional polyesters and organic polyisocyanates are known, but the prior combinations have always been deficient in one or more of several significant test areas which are of importance to the low temperature-curing coatings which are needed in the aerospace industry. These test areas include fluid resistance (to aircraft hydraulic fluid, jet fuel, water and lubricating oils), flexibility, retention of flexibility after ultraviolet light exposure, heat resistance, and flexibility after exposure to heat and weathering. The polyurethane topcoats of this invention exhibit superior performance in every category, and an extensive testing program has demonstrated that the selection of the several components of the polyester, and their proportion of use and the selection of the polyisocyanate are all critical to this achievement.

In accordance with this invention, a highly specific polyester resin is combined in water-free organic solvent medium with the biuret of 1,6-hexamethylene diisocyanate, other organic polyisocyanates not being suitable regardless of proportion, even when the polyester is unchanged. The polyester resin is the polyesterification reaction product of the following components in the following proportions, the range of permissible variation being set forth for each component. This polyester is provided by transesterifying the dimethyl terephathalate with the hydroxy functional components and removing at least 80% (preferably at least 90%) of theoretical methanol, and then esterifying the product with adipic acid to an acid number less than 7, preferably less than 5.

| Component | Parts by Weight | Preferred limits (maximum) | Variation |
|---|---|---|---|
| 1,6-hexanediol | 11.63 | ±0.5 | ±1.0 |
| di (2-hydroxyethyl) dimethylhydantoin | 20.92 | ±0.5 | ±1.0 |
| trimethylol propane | 17.75 | ±0.5 | ±1.0 |
| dimethyl terephthalate | 28.10 | ±0.5 | ±1.0 |
| adipic acid | 21.15 | ±0.5 | ±1.0 |

The polyurethane topcoats have an outstanding balance of properties, and some of these are an initial gloss when measured on a 60° glossmeter is 95 units. It retains about 85% of this gloss after exposure to 500 hours of artificial weathering while maintaining most of its original 60% elongation as measured by the General Electric Impacter on Alclad 2024-TO aluminum. Its fluid resistance is good enough that it suffers no ill effect when immersed in aircraft fuels such as JP-4 for 14 days at ambient temperatures. When exposed to hydraulic fluids such as Skydrol 500B (phosphate ester from Monsanto, St. Louis, Mo.) or Aerosafe 2300 (from Stauffer Chemical, New York) it suffers no ill effect after 7 days immersion. Lubricating oils also have no effect on this topcoat. Some fuels such as Type III and Type VII will soften the topcoat one or two pencil hardness after exposure for one week at ambient conditions, but this is not excessive.

The proportion of the diisocyanate can vary considerably from about 1.5–2.6 NCO/OH, but a preferred ratio is 1.75–2.4 NCO/OH.

As will be evident, all of the solvents must be water free (urethane grade) and appropriate catalysts may be added to the topcoat mixture to speed the low temperature cure, if desired. These catalysts are well known and are illustrated herein by dibutyl tin dilaurate. Also, the topcoats may be clear or pigmented, the latter being preferred as illustrated herein by the use of titanium dioxide.

The invention is illustrated by the following examples of preferred practice.

EXAMPLE 1 (Polyester Production)

Example 1
(Polyester Production)

| RAW MATERIAL | Wt. % |
|---|---|
| 1,6-Hexanediol | 11.63 |
| Dantocol DHE* | 20.92 |
| Trimethylolpropane | 17.75 |
| Triphenyl Phosphite** (bleach) (acid is useful) | 0.19 |
| Dimethylterephthalate (DMT) | 28.10 |
| Tetra 2-ethyl hexyl titanate (esterification catalyst) | 0.26 |
| Adipic Acid | 21.15 |
| | 100.00 |

SC 150 (commercial high boiling mixtures of aromatic hydrocarbons) 3 parts    add to wash down sublimed DMT
2-ethoxy ethanol acetate (urethane grade) for reduction of above resin to 70% NVM
Acidity - about 4. Polyesterification should be less than 7, preferably less than 5.

*Glyco Chemicals, Inc.
**Stauffer Chemical Co.

The named materials (without the adipic acid) are placed in a reactor together with 3 parts of SC 150 under a nitrogen blanket equipped with a packed column to permit the reaction mixture to reflux while any methanol generated passes through the column. The mixture is heated to reflux and methanol is removed for about 2–3 hours until about 95% of the methanol which would be generated by complete reaction has been removed. The adipic acid is then added and refluxing is continued until an acid number of about 4 is reached.

The SC 150 is then removed by sparging with nitrogen.

The product is thinned with 2-ethoxy ethanol acetate to 70% solids and filter. The solution is stable (the acid number and other physical characteristics remain intact for at least a year).

EXAMPLE 2 (Polyester Base)

180 lbs. of the resin solution of Example 1 is added to a pebble-mill and then 350 lbs. of titanium dioxide are added and then 125 lbs. of additional 2-ethoxy ethanol acetate are added and the mill is operated to disperse the pigment and grind it to fine particle size (Hegman rating of 7-7.5). The rest of the solvents are then added with the rest of the resin solution and the mill is operated to provide a homogenous blend. The catalyst is then blended into provide the desired cure rate.

EXAMPLE 3 (Diisocyanate Activator)

365 lbs. of biuret of 1,6-hexamethylene diisocyanate (75% solids in 2-ethoxy ethanol acetate/xylene [1:1 weight ratio]
210 lbs. of methyl ethyl ketone
245 lbs. of 2-ethoxy ethanol acetate
    Mix the above.

EXAMPLE 4 (Preparation of Topcoat and Application)

Examples 2 and 3 are mixed together in equal volume (the activator is added slowly with mixing to the polyester base) and this provides a mixture having an NCO-/OH ratio of about 2.3. The mixture has a viscosity of about 20 seconds in a 190 2 Zahn cup and is adapted for air spray application. It has a pot life under agitation of about 8 hours (dilute with solvent to restore initial viscosity for spraying). An applied film (over primed A1) having a thickness of about 1.5–3 mil dry cures in air at room temperature (25° C.) in about 4 hours (dry to 190 250 Scotch brand pressure sensitive tape) [won't mar or lift the film]. A substantially full cure takes about 7 days at which time the final properties are measured.

Typical final properties are:

| | |
|---|---|
| pencil hardness | HB-F |
| MFK resistance | 100 + double rubs |
| 60° gloss | 95 |
| Skydrol 500B (7 dys.) | no effect |
| Aerosafe 2300 (7 dys.) | no effect |
| deionized water (7 dys.) | no effect |
| JP-4 (7 dys.) | no effect |
| lubricating oil (MIL 5606) (7 dys.) | no effect |
| Impact flexibility on Alclas 2024-T3 aluminum | pass 60 inch pounds of reverse impact |
| heat resistance 300° F. for 4 hrs. | no adverse effect |
| 500 hrs. Weatherometer | gloss retention is 85% |
| elongation | pass 60% (on Alclad 2024-TO aluminum) |

The invention is defined in the claims which follow. We claim:

1. A polyurethane topcoat composition comprising a water-free organic solvent solution containing from 0.5–2.6 isocyanate equivalents of the biuret of 1,6-hexamethylene diisocyanate per hydroxyl equivalent of the polyesterification reaction product of the components set forth below having an acid number of less than 7:

| Component | Parts by Weight | Permitted Variation |
|---|---|---|
| 1,6-hexanediol | 11.63 | ± 1.0 |
| di-(2-hydroxyethyl) dimethylhydantoin | 20.92 | ± 1.0 |
| trimethylol propane | 17.75 | ± 1.0 |
| dimethyl terephthalate | 28.10 | ± 1.0 |
| adipic acid | 21.15 | ± 1.0 |

2. A polyurethane topcoat as recited in claim 1 in which the isocyanate to hydroxyl ratio is 1.5:1 to 2.6:1.

3. A polyurethane topcoat as recited in claim 1 in which the permissible variation for each component is ±0.5 parts.

4. A polyurethane topcoat as recited in claim 1 in which said composition is pigmented with titanium dioxide.

5. A polyurethane topcoat as recited in claim 1 in which said polyesterification reaction product is made by transesterifying said dimethyl terephathalate with the hydroxylfunctional components until at least 80% of theoretical methanol has been removed, and then directly esterifying the product with adipic acid.

6. A polyurethane topcoat as recited in claim 5 in which said transesterification is carried out to remove at least 90% of theoretical methanol and the final polyesterification reaction product has an acid number of less than 5.